INVENTOR.
Walter Kals
BY
Popp and Sommer
ATTORNEYS

United States Patent Office 3,253,350
Patented May 31, 1966

3,253,350
APPARATUS FOR CONDENSING WATER VAPOR UNDER LOW ABSOLUTE PRESSURE AT A TEMPERATURE LESS THAN THE FREEZING POINT OF WATER
Walter Kals, Hastings-on-Hudson, N.Y., assignor to Niagara Blower Company, New York, N.Y., a corporation of New York
Filed Oct. 2, 1963, Ser. No. 313,279
7 Claims. (Cl. 34—75)

This invention relates to apparatus for condensing water vapor such as results from drying frozen materials and more particularly to such apparatus for use in conjunction with a high vacuum drying chamber in which hygroscopic moisture is removed from frozen heat sensitive materials by exposure to a high vacuum or low absolute pressure.

This application is an improvement on the Vacuum Concentrator described and claimed in my United States Patent No. 2,665,750 granted January 12, 1954.

In the following discussion of this invention the absolute pressure will frequently be given in microns of mercury (Hg), 1 micron being 1/1000 of a millimeter. The micron of mercury is a unit of pressure corresponding to a column of mercury exactly 1/1000 of a millimeter high at 0° C. and under standard gravitational force. The pressure of the normal atmosphere is 760 millimeter Hg.

Water may be evaporated directly from a frozen source material by sublimation at a temperature of —40° F. if an absolute pressure of 96 microns Hg is maintained inside the drying chamber. The ice cystals are thus removed from the frozen source material without further changes. The heat of sublimation may be supplied by direct contact or by a radiant source.

In the practice of the present invention, after initial evacuation of the drying chamber, the pressure of 96 microns Hg is maintained by condensing the water vapor at —40° F. The condensing surface must be refrigerated to, say, —50° F., so that the latent heat of condensation is transferred over the 10° F. temperature gradient. The vapor migration from the ice crystals of the frozen source material to the refrigerated condensing surface must be induced by only a very minimal pressure difference, so that the temperature of evaporation and condensation will be virtually equal. Therefore, any restriction to the flow of vapor from the source material being dried to the condenser surface must be avoided.

Noncondensible gases entering the high vacuum condenser by leakage or by being released from the source material must be continually withdrawn and delivered to the atmosphere by a suitable high vacuum pump.

As a distinctive feature of this invention, the refrigerated condensing surface is continually flushed by an aqueous solution of sufficiently low freezing point. As a result the water vapor which is condensed at —40° F. temperature will not form an ice crust on the condensing surface, but the condensate will become a part of the solution which washes this surface.

This liquid solution used in the present invention to flush the refrigerated condensing surface should have particular characteristics. Thus while the liquid solution must have sufficiently low freezing temperature and a vapor pressure lower than that of water, it is important that the antifreeze component be a liquid and completely soluble in all proportions in the water so as to eliminate the possibility of precipitation. It is also important that the solution be free from excessive viscosity at the concentration required for the low temperature involved. More particularly a feature of the present invention resides in the use of ethylene glycol, within a very limited concentration range, rather than a solid, such as lithium chloride, as proposed in my said patent.

As compared with other possible liquids which may also yield aqueous solutions of low freezing temperature and a vapor pressure lower than that of water, ethylene glycol in solution with water has a coexisting vapor phase with about 99% water content. Withdrawal of the noncondensible gases from the condenser in mixture with such solution vapor will therefore only waste the small percentage of ethylene glycol contained in the solution vapor. The mol ratio of solution vapor and noncondensible gases equals the ratio of their partial pressures, the sum of these partial pressures equal the total pressure established by the condensing water vapor. As an example, water vapor condensing at —40° F. will (in the presence of only a negligible fraction of noncondensible gases) establish a pressure of 96 microns Hg inside the vacuum system. The aqueous solution flushing the condensing surface will be at, say, —43° F. temperature with a vapor pressure of 49 microns Hg. The partial pressure of the noncondensible gases in mixture with the solution vapor will then be 47 microns Hg, the sum of the two partial pressures equalling 96 microns Hg. The mol ratio of solution vapor to noncondensible gases will be 49/47 or about 1.043. With only 1% ethylene glycol of relatively low molecular weight contained within the solution vapor and with only a comparatively small quantity of noncondensible gases to be withdrawn, the loss of ethylene glycol will be relatively small.

Aqueous solutions of ethylene glycol, although fairly viscous at temperatures of —40° F. to —50° F., can nevertheless be distributed over the condensing surface so that this surface will always be completely covered by a falling film of the solution and a continuous gravity flow of the film over the surface will be obtained. As previously explained the water vapor which is condensed at —40° F. temperature and 96 microns Hg pressure will not form an ice crust on the washed condensing surface but the condensate will become a part of the solution which washes the surface. It is, however, necessary to maintain the condensation of an aqueous ethylene glycol solution within a range of less than 10% in order to insure adequate fluidity and a sufficiently low freezing temperature of the solution. Also in order to provide continuous operation it is necessary to reject the condensate from the solution at the same rate as the condensate joins the solution.

In contrast with the concentrator (for the antifreeze solution) shown in my said patent, which operates at an intermediate vacuum, the present invention concerns itself with the utilization of a concentrator in which the antifreeze solution surrenders its excess water at atmospheric pressure. The antifreeze solution must again be circulated between the condenser where water is added to the solution, and the concentrator, where this added water is rejected. In accordance with the present invention the solution is transferred in either direction between the condenser at 96 microns Hg pressure and the concentrator at atmospheric pressure with only a minimum of air leakage into the vacuum system.

The above previous patent teaches use of a surge tank, referred to as a weak liquor surge tank, operating at moderate vacuum, and communicating with the high vacuum condenser by a liquid leg of sufficient height to permit the required differential in absolute pressure between condenser and the weak liquor surge tank. The weak solution was then transferred from this weak liquor surge tank to a concentrator, the latter discharging concentrated solution by gravity into a strong liquor receiver of surge tank. Finally, the solution, minus a portion of its water content was returned to the weak liquor surge tank. As outlined in this prior patent, equal absolute pressures were provided in the concentrator, the strong liquor surge tank and the weak liquor surge tank, all operating at the same moderate vacuum.

The present invention also features a weak liquor surge tank operating at a medium vacuum and communicating with the high vacuum condenser by a liquid leg of sufficient height to balance the differential in absolute pressure. The present invention also again provides a strong liquor surge tank, but in contrast to the said patent, this strong liquor surge tank communicates with a strong liquor well operating at a low vacuum or nearly atmospheric pressure, the differential in absolute pressure being again balanced by a liquid leg of sufficient height.

The weak liquor and the strong liquor surge tanks in both the present application and the said patent are at equal absolute pressures or medium vacuum. However, a distinctive feature of the present invention resides in the transfer of solution in either direction.

Another distinctive feature is the communication of the weak liquor surge tank at medium vacuum with a low vacuum or near atmospheric strong liquor well, by way of a liquid leg of sufficient height to balance the differential in absolute pressures. The solution contained in the strong liquor well at low vacuum or nearly atmospheric pressure is maintained at proper concentration by circulating it through an atmospheric concentrator where the excess water is removed from the solution at atmospheric pressure. The two surge tanks, one holding strong liquor and the other holding weak liquor at the same medium vacuum are comparable to the lock of a waterway enabling the raising and lowering of solution from one pressure level to another.

Accordingly a principal object of the invention is to provide such apparatus for use in condensing vapor from a vacuum dryer which evaporates moisture from a frozen source material and in which dryer the ice crystals are removed from the frozen source material by sublimation and in which combination any restriction to the flow of vapor from the source material in the dryer to the condenser surface is minimized so that the temperatures of evaporation and condensation will be virtually equal.

Another object is to provide such apparatus in which the condensation is effected at low temperature and high vacuum at optimum efficiency, this being done by condensing the vapor on the exterior surfaces of tubes in which a refrigerant vaporizes at the rate required to adsorb the heat of condensation from those exterior surfaces.

Another object of the invention is to maintain the condensate in liquid phase, this condensate becoming a part of the low freezing point solution used to flush the condensing surface, thereby to avoid the formation of an ice crust or crystals on this surface.

Another object o fthe present invention is to so flush the refrigerated condensing surface with an aqueous solution having adequate fluidity and at the same time a sufficiently low freezing temperature and a vapor pressure lower than that of water but from which the antifreeze component cannot precipitate, the present invention proposing for this purpose ethylene glycol with a narrow concentration range rather than a solid such as lithium chloride.

Another object of the invention is to obtain complete, continuous and sustained coverage of the outside of the condensing surface with an aqueous low freezing point solution even when the solution is in a viscous condition.

Another object of the invention is to provide continuous operation of the condensing surfaces so flushed with an aqueous antifreeze solution by maintaining the concentration of the aqueous solution within a range of less than 10% and by rejecting the condensate from the solution at the same rate as the condensate joins the solution.

Another object of the invention is to provide such apparatus in which the solution surrenders its excess water content at atmospheric pressure.

Another object is to minimize air leakage into the system and to evacuate air or other noncondensible gas at optimum efficiency, this being achieved by operating the system at at least three pressure levels and evacuating the noncondensibles separately at each pressure level.

Other objects and advantages will appear from the following description and drawings in which:

FIG. 1 is a diagrammatic representation of a high vacuum or low absolute pressure condenser embodying and showing the manner by which it is connected with an atmospheric concentrator in accordance with the present invention.

FIG. 2 is an enlarged vertical section through the high vacuum condenser, revealing the method of keeping the condenser tubes filled with boiling refrigerant and illustrating the means of flushing the external or condensing tube surface continuously and completely with a viscous aqueous low freezing point ethylene glycol solution, all these details being important features of the present invention.

The present invention is preferably parcticed in apparatus including a high vacuum condenser 5 for the vapor from a high vacuum drying chamber (not shown) in which drying chamber the water content of a frozen source material is removed by sublimation, this being obtained by evaporating the water from this source material at a temperature in the order of, say, −40° F., under an absolute pressure of 96 microns Hg. From this drying chamber (not shown), the water vapor, accompanied by a relatively small quantity of noncondensible gases, is drawn through the large inlet opening 6 of the high vacuum condenser 5. It is important that the flow of vapor from the drying chamber through this large inlet opening 6 into the high vacuum condenser 5 be as free from restriction as possible so that the vapor migration from the ice crystals of the source material to the refrigerated condensing surface of the high vacuum condenser 5 be induced by only a very minimal pressure difference so that temperatures of evaporation from the frozen source material and condensation on the condensing surfaces will be virtually equal.

Figure 2:
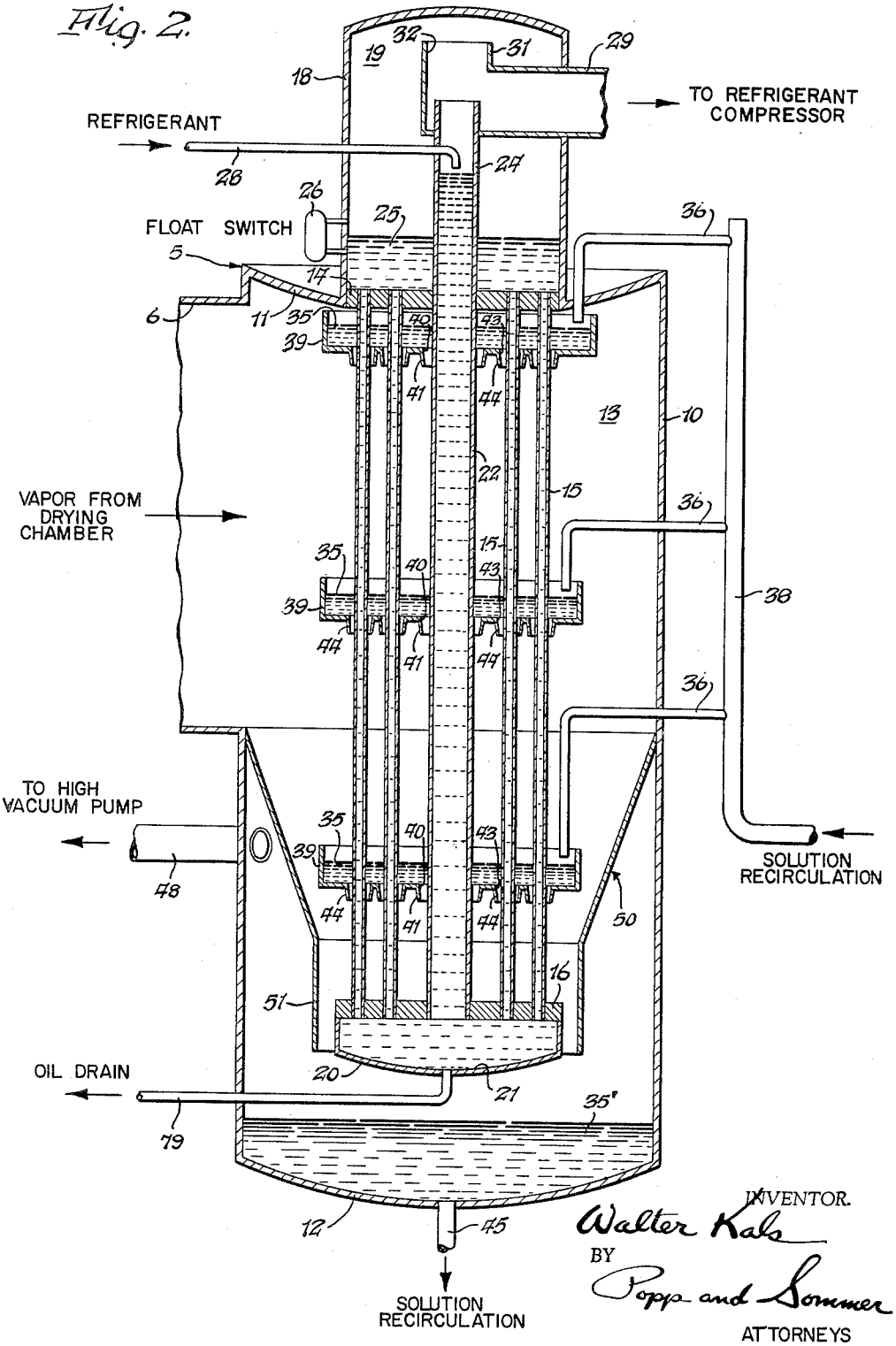

Referring to FIG. 2 the high vacuum condenser 5 is shown as comprising a tubular metal body or shell 10 having an upper end head 11 and a lower end head 12, the large vapor inlet 6 leading into the interior 13 of this shell. The upper end head 11 is in part formed by an upper tube sheet 14 connected by a bundle of vertical condensing tubes 15 with a lower tube sheet 16 arranged in the bottom part of the shell 10. The top side of the upper tube sheet 14 is enclosed by an outlet header 18 forming a chamber 19 with which the upper ends of the condensing tubes 15 are in communication. The underside of the bottom tube sheet 16 is enclosed by a return header 20 forming a chamber 21 with which the lower ends of the condensing tubes 15 are in communication. A large central liquid refrigerant downtake leg 22 at the center of the bundle of condensing tubes 15 extends coaxially through the tube sheets 14 and 16 and at its lower end discharges into the chamber 21 while its upper end rises in the manner of a stand pipe, as indicated at 24, into the upper part of the chamber 19 and above the level of liquid refrigerant 25 therein, this level being maintained by float switch 26, via an electric valve 27 controlling the admission of liquid refrigerant from an inlet line 28 into the upper end of the central liquid refrigerant leg 22. The upstanding upper end 24 of this large central liquid downtake leg 22 also extends through the bottom of a refrigerant gas outlet suction tube 29 leading to a compressor 30, this upper portion of the liquid refrigerant downtake leg 22 reaching into this suction connection 29 so that the portion of the liquid refrigerant flashing into vapor as it is released from 28 at lower pressure will pass directly to the compressor. To reduce the possibility of any entrained liquid refrigerant 25 in the chamber 19 from passing into the refrigerant vapor suction line 29, its inlet end is preferably in the form of an upwardly directed elbow 31 with its inlet opening 32 close to the upper end of the outlet header 18.

The bundle of condenser tubes 15 with their headers 18 and 20 form the expansion coil or heat exchanger of the expander of a conventional compressor-condenser-expander refrigerating system, the compressor 30 of which is connected by a line 33 to a condenser 34 the outlet line 28 from which discharges into the upper end of the liquid downtake leg 22 of the expander, as previously described.

The vapor, plus uncondensible gasses, from the drying chamber entering through the inlet 6 into the chamber 13 surrounding the bundle of condenser tubes 15 condenses on these tubes and in the absence of provision to prevent it would condense in the form of ice, gradually building up on these condenser tubes and progressively rendering them less and less effective. To prevent the formation of ice on these condenser tubes, as well as upon the liquid downtake leg 22, their external surfaces are continuously and completely flushed by an aqueous solution 35 having a sufficiently low freezing point and a vapor pressure lower than the condensing pressure of the water vapor. In order to prevent precipitation of solids, such as might occur if a solid salt such as lithium chloride were used, the antifreeze component of the solution 35 is preferably a liquid miscible with water in all proportions and to this end, and to obtain required fluidity, it has been found that an aqueous ethylene glycol solution with a narrow concentration range, has been found to be satisfactory.

At the low temperatures maintained on the surface of the condenser tubes 15, say —15° F., the ethylene glycol solution becomes viscous and in order to cover the outside of the condenser tubes 15 completely and continuosly with a layer of the solution 35 moving by gravity down the exterior of the tubes, the solution is supplied via branch lines 36 extending through the shell 10 from a solution recirculation line 38, into a number of trays 39 arranged in vertically spaced relation in the chamber 13. Each of these trays is provided with a large central opening 40 surrounded by downturned boss or rim 41 the inside diameter of which is in closely spaced relation to the large central downtake liquid refrigerant leg 22. Each of these trays is likewise provided in its bottom with a plurality of holes 43 through which the several condenser tubes 15 extend and each of which holes is provided with a downturned rim or boss 44 the inside diameter of which is in closely spaced relation to the contained condenser tube 15.

This ethylene glycol solution 35 flowing down the tubes 15, 22 is diluted by moisture condensing from the vapor admitted to the chamber 13 from the drying chamber (not shown) and flows over the bottom tube sheet 16 and return header 20 to form a pool 35' in the bottom of the shell 10, the diluted solution from this pool being withdrawn through a solution recirculation line 45 connecting with the inlet of the recirculating pump 46.

The required vacuum of, say, 96 microns Hg is maintained in the chamber 13 by a vacuum line 48 leading to the inlet of a high vacuum pump 49. This high vacuum pump also removes uncondensible gases entering with the frozen source material. A skirt or baffle 50 insures all water vapor condensing on the condensing tubes 15 before being withdrawn by this vacuum line 48. This skirt or baffle preferably is in the form of an upper frusto-conical part having its larger upper rim secured to the inside of the tubular shell 10 below the vapor inlet 6 and having its lower cylindrical end 51 surrounding in closely spaced relation to the bundle of condenser tubes 15 and the return header 20 but spaced above the body of diluted ethylene glycol solution 35' contained in the bottom of the shell 10.

The outlet line from the ethylene glycol solution recirculating pump 46 is the line 38 serving the branches 36 discharging into the several trays 39 so that the ethylene glycol solution is continuously being recirculated by this pump over the external condensing surfaces of the tubes 15, as well as the tube 22, to condense and abstract moisture from the vapor entering the chamber 13 from the drying chamber (not shown). The outlet of the pump 46 is connected to another line 52 which discharges into a weak liquor surge tank 53 having a bottom outlet line 54 leading back to the solution recirculation line 45.

To effect the necessary reconcentration of the ethylene glycol solution so being recirculated by the pump 46, the solution recirculation line 38 is provided with a branch 55 through which the recirculating ethylene glycol solution, under control of an electric valve 56, is discharged into a strong liquor surge tank 58 the bottom of which contains a pool 35" and is continued in the form of a substantially barometric liquid leg 59 discharging into a strong liquor well 60, the lower end of this liquid leg 59 being submerged in the body 35''' of ethylene glycol solution 35 maintained in this strong liquor well.

A medium vacuum of, say, 50 mm. Hg, is maintained in the weak liquor surge tank 53 and the strong liquor surge tank 58 by a vacuum line 62 leading to the suction of a medium vacuum pump 63, and a low vacuum, close to atmospheric pressure (normally 760 mm. Hg), is maintained in the strong liquor well 60 by a low vacuum pump 64.

The body of ethylene glycol solution 35''' contained within the strong liquor well 60 is constantly being recirculated through an atmospheric concentrator indicated generally at 65 and which serves to evaporate water from the ethylene glycol solution and thereby reconcentrate the solution to the required strength of its ethylene glycol component for use on the tubes 15, 22 of the high vacuum condenser 5 as previously described. An example of such a concentrator being disclosed in the Stutz Patent 2,825,680, granted March 4, 1958 for Apparatus for Concentrating Aqueous Solutions of Hygroscopic Organic Substances. The ethylene glycol solution is withdrawn from the body 35''' within the strong liquor well by a pump 66 which passes the solution through a heat exchanger 68 and thence through a line 69 into the atmospheric concentrator 65. The reconcentrated solution is withdrawn from the atmospheric concentrator 65 by a pump 70 which returns it through the heat exchanger 68 and thence through a line 71 into the strong liquor well 60.

The ethylene glycol solution 35''' in the strong liquor well 60 is withdrawn by a pump 72, the discharge line 73 from which discharges back into the strong liquor surge tank 58 for recirculation through the strong liquor well 60. However, a part of the discharge from the strong liquor pump 72, under control of an electric valve 74, is discharged via a branch line 75 of the line 73 into the weak liquor surge tank 53. The vacuum line 62 leading to the medium vacuum pump 63 connects with this weak liquor surge tank 53 to maintain a medium vacuum of, say, 50 mm. Hg, therein and the line 54 returns the solution 35'''' from the lower end of the weak liquor surge tank 53 back to the line 45 for recirculation via the pump 46 over the external surfaces of the refrigerant tubes 15 and 22.

A conventional oil drain 79 containing a valve 80 is provided for the lower return header 20 of the refrigerant expander in the high vacuum condenser 5.

*Operation*

Figure 1:
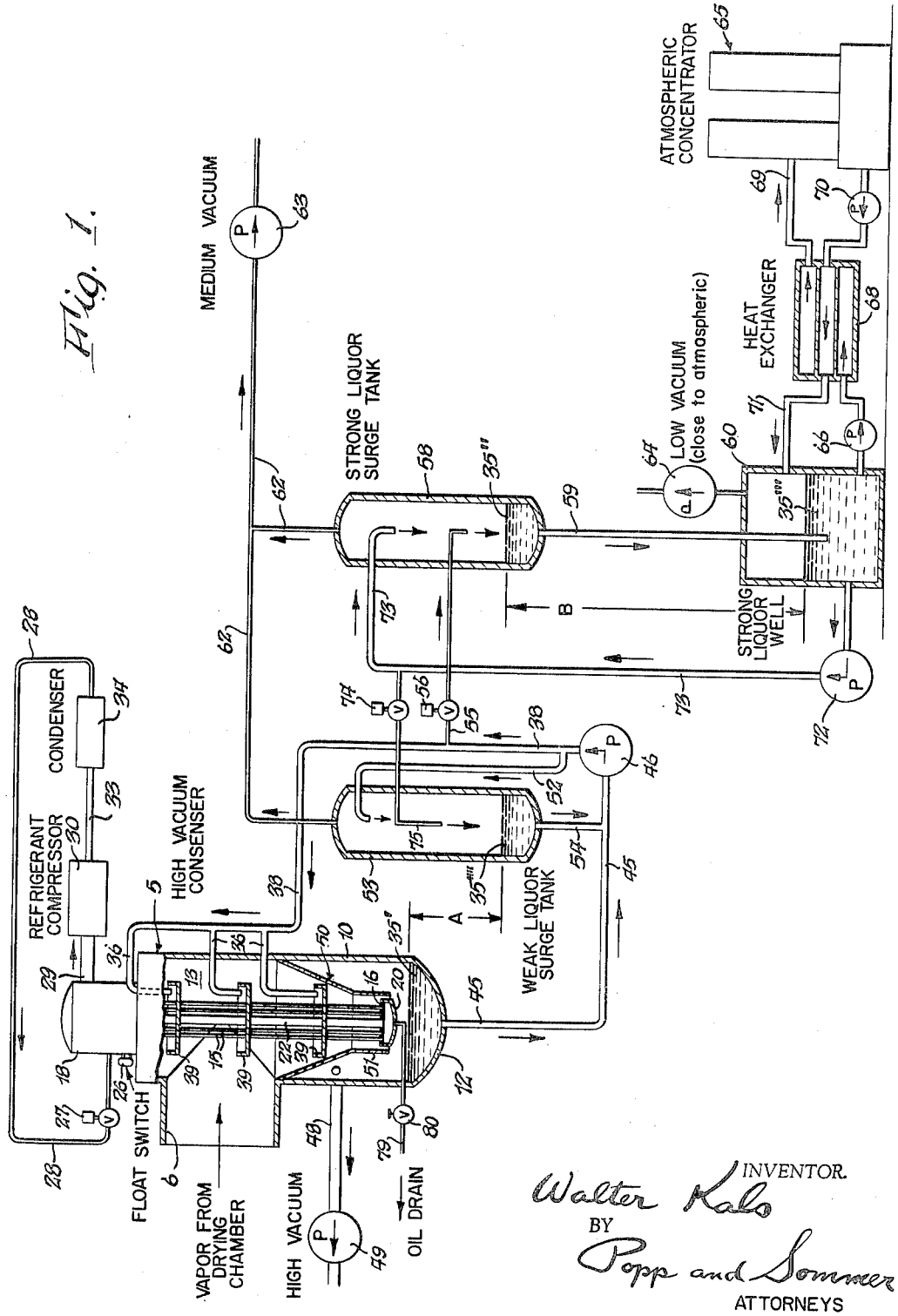

It will be assumed that moisture is being abstracted from a frozen source material in a drying chamber (not shown) by sublimation and that for this purpose a pressure of 96 microns Hg is maintained in this chamber via the vapor inlet 6 to the chamber 13 within the shell 10, this pressure being maintained by the high vacuum pump 49 having its inlet 48 connected with this chamber 13. It will also be assumed that a medium vacuum, in the order of 50 mm. Hg, is being maintained by the medium vacuum pump 63 in the strong liquor surge tank 58 and weak liquor surge tank 53. Under these conditions the differential in the levels between the bodies 35' and 35'''' in the shell 10 and weak liquor surge tank 53, respectively, is determined by the differential between the assumed high vacuum of 96 microns Hg maintained in the chamber 13 by the high vacuum pump 49 and the assumed medium vacuum of 50 mm. Hg maintained in the weak liquor surge tank 53 by the medium vacuum pump 63, this level differential being indicated at A in FIG. 1. It will also be assumed that a low vacuum close to normal atmospheric pressure of 760 mm. Hg is being maintained in the strong liquor well 60 by the low vacuum pump 64 and hence the differential in the level of the bodies 35'' and 35''' in the strong liquor surge tank 58 and strong liquor well 60 is determined by this differential between medium and low vacuum. This differential in liquor level is represented at B in FIG. 1.

It will also be assumed that the atmospheric concentrator 65, which can be of the form disclosed in the said Stutz Patent 2,825,680, is evaporating water at atmospheric pressure from the ethylene glycol solution passing therethrough into the atmosphere.

It will also be assumed that a temperature of −50° F. is being maintained on the exterior surface of the condenser tubes 15 by the compressor-condenser-expander system shown of which these condenser tubes 15 form a part of the expander and the compressor and condenser of which are designated at 30 and 34, respectively. The flow and evaporation of the liquid refrigerant in the expander of which the tubes 15, 22 form a part is an important feature of the present invention and is as follows:

The condensed refrigerant from the condenser 34 passes through the line 28, under control of the float switch 26 and electric valve 27, into the upper end of the large liquid refrigerant leg 22 which conducts the liquid refrigerant into the bottom return refrigerant header 20. Any refrigerant vapor flashing on discharge from the outlet of line 28 into the top of the liquid refrigerant leg 22 passes directly out through the open top of this leg into the suction line 29 to the compressor 30. The liquid refrigerant in the bottom return header 20 rises inside the condenser tubes 15 until a liquid refrigerant level for a body 25 is established in the header 18 by the float switch 26. As water vapor condenses on the outside of the condenser tubes 15, the heat of condensation causes the liquid refrigerant to boil inside these tubes. The refrigerant vapor is released from the upper ends of these tubes 15 into the upper portion of the chamber 19 formed by the upper outlet header 18, whence it is withdrawn by the suction line 29 to the compressor 30. The upturned inlet end 31 of this suction line 29 is close to the top wall of the outlet header 18 to minimize splashing of liquid refrigerant into this suction line 29 leading to the refrigerant compressor. Thus the compressor maintains a refrigerant evaporating pressure corresponding to the required evaporating temperature. It is to be noted that the liquid refrigerant level inside the liquid refrigerant leg 22 is higher than the level of the liquid refrigerant body 25 in the outlet header 18, the difference of these two levels being needed to induce a flow of liquid refrigerant down through the leg 22 and up through the condensing tubes 15.

The condensing surfaces of the condenser tubes 15 are continuously and completely flushed by an aqueous ethylene glycol solution of adequate fluidity and low freezing point and having a vapor pressure lower than the condensing pressure of water vapor. In order to cover the outside of each condenser tube 15 completely with a falling film of this solution, the solution is supplied by the pump 46 and outlet lines 38 and 36 into the several trays 39. The solution escapes from these trays through the openings 43 provided around each condenser tube 15 and also through the openings 40 around the liquid refrigerant leg 22. These annular openings terminate in nozzles 44 and 41, respectively, and a sufficiently high level of bodies 35 of solution in the trays 39 provides the required static pressure for ejecting the solution out through these nozzles, which direct the flow of solution around the circumference by these condenser tubes 15 as continuous unbroken films which descend by gravity.

Eventually all the ethylene glycol solution being supplied to these trays 39 collects as a body 35' in the bottom of the condenser shell 10 from which it is removed by the pump 46 for recirculation through the lines 38, 36, and a part of this solution is also recirculated through a weak liquor surge tank 53 by another outlet line 52 from the discharge of the recirculation pump 46 and a line 54 leading back to the inlet line 45 of this pump, a medium vacuum of, say 50 mm. Hg, is maintained in the weak liquor surge tank by the vacuum pump 63.

Part of the output from this pump passes under control of an electric valve 56 through a branch line 55 into the strong liquor surge tank 58. In the bottom of this strong liquor surge tank it joins the body of solution 35'' and flows down the barometric leg 59 into the strong liquor well 60 to join the body 35''' of solution therein. Since the medium vacuum pump 63 maintains the assumed 50 mm. Hg vacuum in the strong liquor surge tank 58, and only approximately atmospheric pressure (normally 760 mm. Hg) is maintained by the low vacuum pump 64 in the strong liquor well 60, the differential B in the levels of these bodies 35'' and 35''' of solution is a function of these pressure differentials and the leg 59 must be long enough to accommodate such level differential B.

The solution from the body 35''' in the strong liquor well 60 is passed by the pump 66 through the heat exchanger 68 into the atmospheric condenser 65 where it is heated to about 120° F. and exposed to a stream of ambient air which abstracts water from the solution and reconcentrates it. The reconcentrated stream is withdrawn from the atmospheric concentrator 65 and returned by the pump 70 through the heat exchanger 68 to the strong liquor well 60.

The liquor from this strong liquor well is recirculated through the strong liquor storage tank 58 and also returned to process by the pump 72 and line 73, the return to process being through a branch line 75 under control of an electric valve 74 into the weak liquor surge tank 53. The solution in the high vaccum condenser 5 is maintained at proper concentration by feeding diluted solution to the strong liquor surge tank 58 through the electrically operated valve 56 and line 55 and by returning concentrated solution to the weak liquor surge tank 53 through the electrically operated valve 74 and branch line 75. From this weak liquor surge tank 53 the solution returns to process via line 54 from which it is recirculated by the pump 46 through the high vacuum condenser 5.

As can be seen, the noncondensible gas entering the concentrating side of the apparatus are essentially removed by the medium vacuum and low vacuum pumps 63 and 64. This is one of the distinct advantages of the present invention. Only noncondensible gas entering the high vacuum drying chamber (not shown) and the high vacuum condenser 5 directly by leakage or by being released from the source material being processed must be removed by the high vacuum pump 49. The present invention provides cooling of these noncondensible gases so entering the high vacuum pump 49 to the lowest possible temperature so that these gases will have a minimum vapor content. After all water vapor has been condensed on the condenser tubes 15, the accompanying noncondensible gases must pass together with the ethylene glycol solution through the diminishing orifice of the conical skirt 50. Thus the temperature of the noncondensible gases is reduced from that of the condensing water vapor to the somewhat lower temperature of the ethylene glycol solution by intimate contact with the latter. The suction line 48 of the high vacuum pump 49 is placed just below the top of the skirt 50 to that the ethylene glycol solution falling into the bottom of the high vacuum condenser 5 will separate from the noncondensible gases rising to this suction line 48, the counterdirectional flow promoting the separation.

It will also be noted that the present apparatus involves at least three stages of absolute pressures, namely, the assumed high vacuum of 96 microns Hg maintained by the high vacuum pump 49 in the high vacuum condenser 5 and drying chamber (not shown); the medium vacuum of the assumed 50 mm. Hg maintained by the medium vacuum pump 63 in the surge tanks 53 and 58; the low vacuum maintained by the low vaccum pump 64 in the strong liquor well 60; and the atmospheric pressure maintained in the atmospheric concentrator 65. The ethylene glycol solution passes back and forth through these stages of absolute pressure in its service of preventing icing up of the condenser tubes in the high vacuum condenser and in its being reconcentrated in the atmosphere.

As previously indicated, of all antifreeze solutions available, only an aqueous ethylene glycol solution has been found to be suitable at the required high vacuum (96 microns) and at the required low temperature (−50° F.) of the condenser tubes 15, in order to dry frozen source material by sublimation. Further even with aqueous ethylene glycol it is necessary to maintain the concentration within very close limits, namely, at from about 57% to about 65% by weight of ethylene glycol. The necessity for maintaining the ethylene glycol within such close limits is demonstrated by the graphs, FIGS. 3 and 4.

Figure 3:
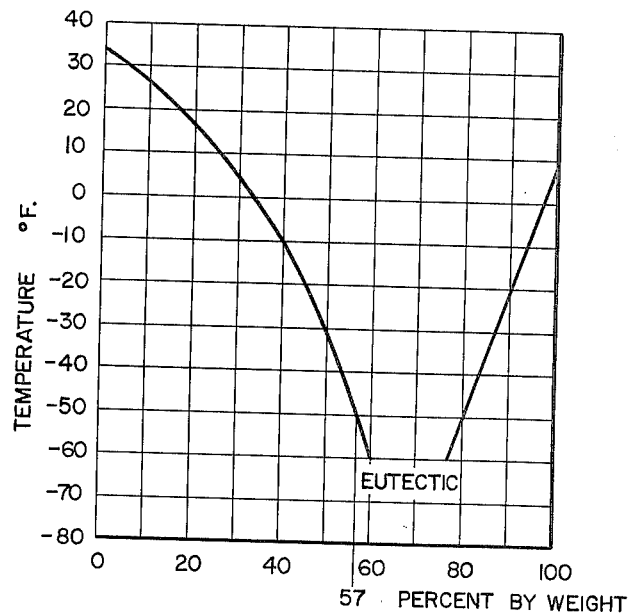
FIG. 3 is a graph of the freezing points of aqueous ethylene glycol solutions at various concentrations.
Figure 4:
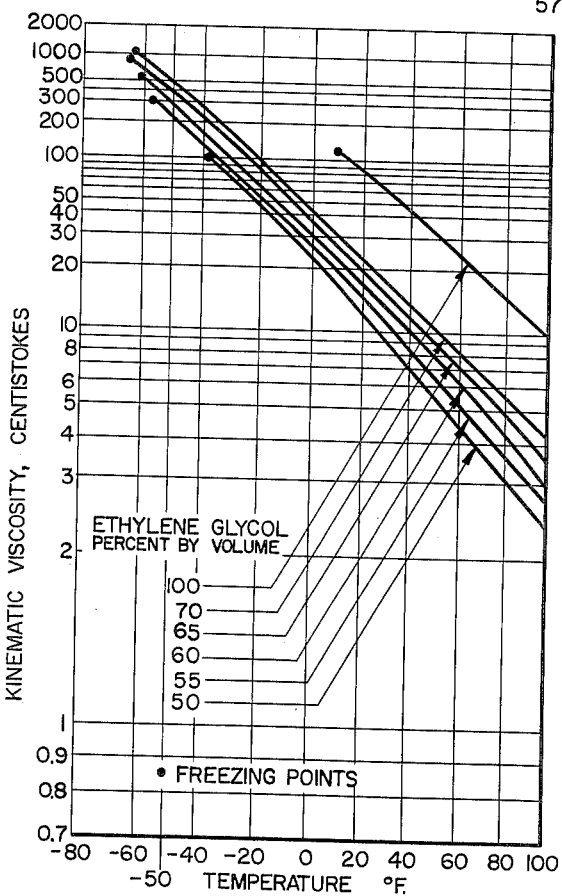
FIG. 4 is a graph of the viscosity of aqueous ethylene glycol solutions of different concentrations.

The lower concentration limit of 57% ethylene glycol is dictated by its freezing point curve, FIG. 3. Thus, referring to this curve, the −50° F. line intersects the ethylene glycol freezing point curve at about the 57% concentration line so that at concentrations below about this concentration the solution would be in danger of freezing on the −50° F. tubes 15, especially when under heavy load and with a corresponding heavy dilution of the falling films of ethylene glycol solution by the condensing vapor. On the other hand, the aqueous glycol solution cannot exceed about 65% since, referring to the graph, FIG. 4, the 65% concentration line intersects the −50° F. line at about the highest viscosity level which will provide falling films of adequate movement to carry away the condensing vapor. It will therefore be seen that in condensing water vapor at a vacuum of 96 microns with refrigerated surfaces maintained at −50° F., the use of a 57–65% by weight solution of ethylene glycol solution as a falling film to prevent icing of these surfaces and against which the noncondensibles as well as the vapor is brought into intimate contact has a number of important and surprizing advantages, namely, (1) the solution will not freeze on the refrigerated surfaces even when subjected to dilution in condensing the vapor, (2) the fluidity of the solution is such that it will descend rapidly as a falling film on the surfaces, (3) the solution will not boil at the temperature of which water vapor condenses, (4) little ethylene glycol vapor will be carried away with the noncondensible gases because of the intimate contact of these gases with the falling films before being withdrawn by the high vacuum pump, (5) the coexisting vapor phase of the solution contains only a very minor portion of solute, (6) there is no danger of salting out or precipitation of solids as would be possible, for example, with lithium chloride, (7) by successive stages of pressure, the solution can be brought to atmospheric pressure, and (8) the solution can be reconcentrated at relatively low heating temperature (120° F.) by contact with air and with little loss of ethylene glycol.

I claim:

1. Apparatus for condensing water vapor under low absolute pressure at a condensing temperature less than the freezing point of water, comprising a condenser shell having an inlet for the water vapor to be condensed, refrigerating means including a heat exchange surface adapted to be maintained below the freezing point of water, means adapted to contact a low freezing point liquid with said heat exchange surface and with the vapor in said condenser shell to condense said vapor into and thereby dilute said low freezing point liquid and to maintain said low absolute pressure in said condenser shell, a weak liquor surge tank, means adapted to recirculate said diluted low freezing point liquid from said condenser shell to said weak liquor surge tank and back into contact with said heat exchange surface and into contact with said vapor in said condenser shell, an atmospheric concentrator, a strong liquor surge tank, means adapted to recirculate liquid from said strong liquor surge tank through said atmospheric concentrator and back to said strong liquor surge tank, means adapted to recirculate said low freezing point liquid from said weak liquor surge tank to said strong liquor surge tank and back to said weak liquor surge tank and means adapted to maintain a medium vacuum in both of said surge tanks, said surge tanks thereby providing a two stage lock between said low absolute pressure condenser shell and said atmospheric concentrator.

2. Apparatus as set forth in claim 1 wherein said means adapted to maintain a medium vacuum in both of said surge tanks is a vacuum pump common to both surge tanks whereby substantially the same medium vacuum is maintained in both surge tanks.

3. Apparatus as set forth in claim 1 wherein said condenser shell is at a higher elevation than said weak liquor surge tank and said means adapted to recirculate said low freezing point liquid from said condenser shell to said weak liquor surge tank includes a pipe filled with said low freezing point liquid to form a liquid seal between said condenser shell and weak liquor surge tank, and wherein said strong liquor surge tank is at a higher elevation than said atmospheric concentrator and said means adapted to recirculate liquid from said strong liquor surge tank through said atmospheric concentrator includes a pipe filled with liquid to form a liquid seal between said strong liquor surge tank and atmospheric concentrator.

4. Apparatus as set forth in claim 3 wherein said means adapted to recirculate liquid from said strong liquor surge tank through said atmospheric concentrator includes a strong liquor well adapted to contain a body of said low freezing point liquid and in which the bottom of said last named pipe is submerged.

5. Apparatus as set forth in claim 4 additionally including means adapted to maintain a close to atmospheric vacuum in said strong liquor well.

6. Apparatus as set forth in claim 1 wherein said heat exchange surface is in the form of vertical tubes housed within said condenser shell and wherein said means adapted to contact said low freezing point liquid with said heat exchange surface and with the vapor in said condenser shell comprises at least one horizontal pan having openings through which said vertical tubes extend in closely spaced relation to the rims of said openings, the low freezing point liquid being supplied to said pan to pass through said openings and form a falling film covering the exterior surface of each tube.

7. Apparatus as set forth in claim 1 wherein said heat exchange surface is in the form of a bundle of vertical tubes housed within said condenser shell and additionally including a pump adapted to evacuate noncondensible gases from said condenser shell and baffle means in said condenser shell arranged to constrain the incoming vapor to pass in close proximity to said bundle of tubes whereby noncondensible gases present are chilled to a low temperature before entering said pump.

References Cited by the Examiner

UNITED STATES PATENTS

| | | | |
|---|---|---|---|
| 2,114,787 | 4/1938 | Smith | 55—32 X |
| 2,515,098 | 7/1950 | Smith | 34—5 |
| 2,665,750 | 1/1954 | Kals | 159—23 |
| 2,747,382 | 5/1956 | Sloan | 62—271 |
| 3,132,929 | 5/1964 | Thuse | 34—5 X |

FOREIGN PATENTS 932,576  7/1963  Great Britain.

WILLIAM F. O'DEA, *Primary Examiner.*

ROBERT A. O'LEARY, *Examiner.*

W. E. WAYNER, *Assistant Examiner.*